United States Patent

Schnell

[15] 3,702,641
[45] Nov. 14, 1972

[54] CONVEYING SYSTEM
[72] Inventor: Gerhard Schnell, Stuttgart, Germany
[73] Assignee: Robert Bosch GmbH, Stuttgart, Germany
[22] Filed: Jan. 14, 1971
[21] Appl. No.: 106,324

[30] Foreign Application Priority Data
Feb. 3, 1970  Germany.........P 20 04 689.3

[52] U.S. Cl..........180/14 R, 180/14 C, 280/33.99 R, 280/405
[51] Int. Cl. ................................................B60d 1/00
[58] Field of Search ...180/14; 280/33.99 R, 33.99 T, 280/43.12, 405 R, 423 R

[56] References Cited

UNITED STATES PATENTS

| | | |
|---|---|---|
| 3,524,512 | 8/1970 | Voeks et al. ....280/33.99 R X |
| 2,957,650 | 10/1960 | Horan et al. .........180/14 R X |
| 2,761,522 | 9/1956 | Paradiso et al.........280/5 R X |
| 3,503,466 | 3/1970 | Rosander.................180/11 X |
| 2,703,659 | 3/1955 | Hutchins............280/423 R X |
| 3,542,414 | 11/1970 | Nelson...............280/423 R X |

FOREIGN PATENTS OR APPLICATIONS 600,130  4/1948  Great Britain..........180/14 C Primary Examiner—Benjamin Hersh
Assistant Examiner—John P. Silverstrim
Attorney—Michael S. Striker

[57] ABSTRACT

A mobile load-carrying unit has ground-engaging wheels and a body which is supported upwardly spaced from the ground by these wheels. A self-propelled vehicle unit is also provided with wheels on which it can travel in a given path on the ground and is dimensioned to fit beneath the body of the load-carrying unit. Cooperative force-transmitting portions are provided on the two units and so act with one another as to exert downwardly directed pressure upon the vehicle unit when the latter is beneath the load-carrying unit and travels in its predetermined path, so that the conveying force exerted by the vehicle unit upon the load-carrying unit in a sense propelling the latter is in part converted into a component of force acting on the vehicle unit in direction toward the ground to increase frictional engagement of the wheels of the vehicle unit with the same.

9 Claims, 3 Drawing Figures

INVENTOR
Gerhard Schnell

CONVEYING SYSTEM

BACKGROUND OF THE INVENTION

The present invention relates generally to conveying systems, and more particularly to a conveying system in which a self-propelled vehicle unit is intended to convey a mobile load-carrying unit.

It is of course already known to provide load-carrying units with wheels, rollers or the like so that they are mobile. These units are then pushed or pulled in a desired direction by a self-propelled vehicle unit which can be releasably connected with them. The problem with these prior art constructions is the fact that the self-propelled vehicle unit must have a weight corresponding at least substantially to that of the mobile load-carrying unit because otherwise the ground-engaging wheels of the vehicle unit would slip during starting-up or braking, due to insufficient friction with the ground. For this reason the known self-propelled vehicle units in conveying systems of the type here under discussion are all of very considerable weight. The actual constituent components of the vehicle units which are necessary for fullfilling the intended functions—absent a consideration of preventing slippage of the wheels—do not in toto have a weight anywhere near the final weight required, and the reason for obtaining this final greater weight results from the necessary addition of ballast so that the final weight of the vehicle unit must at least substantially equal the weight of the mobile load-carrying unit.

Needless to say this is wasteful not only in terms of the material or materials required for obtaining this additional weight, but also in terms of energy consumption for propelling this additional weight.

SUMMARY OF THE INVENTION

It is, accordingly an object of the present invention to overcome this disadvantage outlined above.

More particularly it is an object of the present invention to provide an improved conveying system of the type under discussion which is not possessed of this disadvantage.

Still more particularly it is an object of the invention to provide an improved conveying system of this type wherein the self-propelled vehicle unit or units may have a significantly lower weight than the mobile load-carrying unit or units which are to be propelled by them.

An additional object of the invention is to provide such a conveying system in which these purposes are achieved in a simple, economical but reliable manner.

In pursuance of the above objects, and others which will become apparent hereafter, one feature of the invention resides in a conveying system which, briefly stated, comprises at least one mobile load-carrying unit having ground-engaging first wheels and a body supported by these first wheels upwardly spaced from the ground. At least one self-propelled vehicle unit is provided with ground-engaging second wheels and adapted to travel in a given path, the vehicle unit being so dimensioned as to fit beneath the body of the load-carrying unit. There is further provided cooperatively engageable force-transmitting means provided on the respective units and operative, when engaged, for transmitting to the load-transmitting unit a conveying force in response to travel of the vehicle unit in the aforementioned path, and for concomitantly transmitting to the vehicle unit a component of force which acts in direction toward the ground to thereby facilitate frictional engagement of the wheels of the vehicle unit with the ground.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
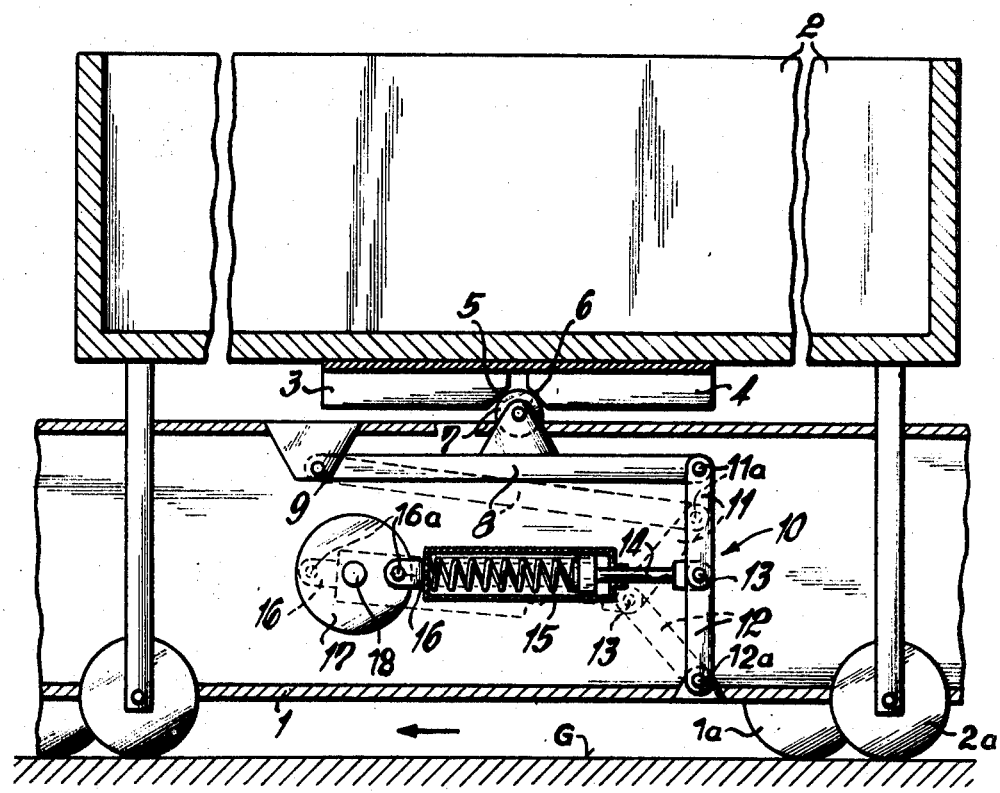
FIG. 1 is a diagrammatic side view, partly in vertical section, of an embodiment of the invention.

Discussing firstly the embodiment illustrated in FIG. 1 it will be seen that reference numeral 1 generally identifies a diagrammatically illustrated self-propelled vehicle unit. Reference numeral 2 similarly identifies a diagrammatically illustrated mobile load-carrying unit which is maintained upwardly spaced above the ground G by its wheels 2a. The vehicle unit 1 is mounted on wheels 1a and is built so low that it can readily fit beneath the load-carrying unit 2 as illustrated. No attempt has been made to show a propelling means for the unit 1, because such propelling means are well-known in form of electrically operated drives, combustion engines and the like, and form no part of the present invention other than to note that in accordance with conventional practice a self-propelled vehicle unit will of course have a means for propulsion.

It is the purpose of the vehicle unit 1 to move beneath the load-carrying unit 2 and to propel or tow the same to a desired location, for instance in the direction of the indicated arrow. For this purpose it must be coupled with the unit 1 at the beginning of the conveying operation, and must be uncoupled therefrom when the unit 2 has reached its desired location. Conventionally a unit such as the unit 1 has had to have a weight which at least substantially is the same as that of the load-carrying unit 2 which it is to propel, to make starting-up and braking of the unit 1 with the coupled unit 2 possible without slippage of the wheels of the unit 1 on the ground G.

In accordance with the present invention this is no longer necessary and the vehicle unit 1 can be substantially lighter in weight than the unit 2. To make this possible it is necessary in accordance with the present invention to so use the acceleration forces on start-up, and the deceleration forces on braking, that they increase friction between the wheels 1a of the vehicle unit 1 and the ground G.

For this purpose the embodiment of FIG. 1 provides elements 3 and 4 which are arranged on the underside of the body of the load-carrying unit 2 and provided with respective upwardly converging surfaces 5 and 6

3,702,641

Figure 2:
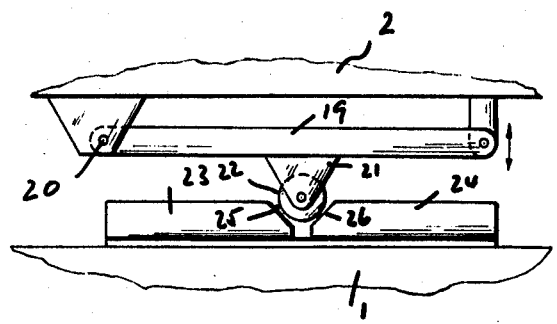
FIG. 2 is a fragmentary side-elevational detail view illustrating another embodiment of the invention.
Figure 3:
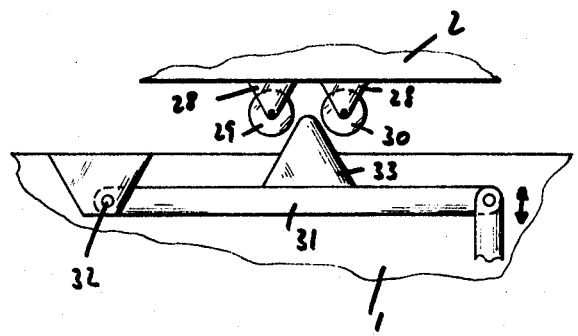
FIG. 3 is a view similar to FIG. 2 but illustrating still a further embodiment of the invention.

FIGS. 2 and 3 effect displacement of the arms 19 and 31, respectively, in the direction of the indicated double-headed arrows is the same as that shown in FIG. 1 for displacement of the arm 8. It need hardly be pointed out that the arrangement of the various components of the units 1 and 2 in FIGS. 2 and 3 could also be reversed, that is the components shown in these Figures on the unit 1 could be provided on the unit 2, and vice versa.

It will be understood that each of the elements described above, or two or more together, may also find a useful application in other types of constructions differing from the types described above.

While the invention has been illustrated and described as embodied in a conveying system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended:

1. A conveying system, comprising at least one mobile load-carrying unit having ground-engaging first wheels and a body supported by said first wheels upwardly spaced from the ground; at least one self-propelled vehicle unit provided with ground-engaging second wheels and adapted to travel in a given path, said vehicle unit being dimensioned to fit beneath said body; and cooperative force-transmitting means provided on the respective units engageable with each other during movement of said units relative to each other in either direction along said path and operative, when engaged, for transmitting to said load-carrying unit a conveying force in response to travel of said vehicle unit in said path, and for concomitantly transmitting to said vehicle unit a component of force acting in direction towards the ground to thereby facilitate frictional engagement of said second wheels with the same without lifting any part of said load-carrying unit from the ground, said force-transmitting means comprising at least one first element provided on one of said units and having two surfaces whose respective general planes extend transversely of said path and are inclined towards the ground in mutually opposite directions of said path, and at least one second element provided on the other of said units and adapted for force-transmitting engagement with one or the other of said surfaces.

2. A conveying system as defined in claim 1, said force-transmitting means comprising an arm pivoted to one of said units for movement between an upper and a lower position and provided with said first element, said inclined surfaces thereof forming a wedge-shaped projection, and said second element comprising a pair of rollers for turning movement about axes transversely of said path and spaced from another in direction of said path so that said projection is receivable between said rollers with said arm in said upper position.

3. A conveying system as defined in claim 1, said body having an underside facing the ground, and said first element being mounted on said underside.

4. A conveying system as defined in claim 1, said body having an underside, and said second element being mounted on said underside projecting downwardly therefrom; and wherein said vehicle unit has an upper side and said first element is mounted in the region of said upper side with said surfaces facing said underside for engagement with said second element.

5. A conveying system as defined in claim 1, wherein said second element comprises an entraining roller and mounting means mounting said entraining roller for displacement between a withdrawn position and an extended position in only the latter of which it can engage the respective surfaces.

6. A conveying system as defined in claim 5, said mounting means comprising a toggle lever on said other unit carrying said entraining roller and displaceable between an erected position in which said roller assumes said extended position thereof, and a collapsed position in which said roller assumes said retracted position thereof, and actuating means for displacing said toggle lever between said erected and collapsed positions.

7. A conveying system as defined in claim 6, said toggle lever comprising a pair of sections and a pivot connecting said sections for relative pivotal displacement of the same; and wherein said actuating means comprises a turnably mounted crank disc, a rod eccentrically pivoted to said crank disc, and spring means connected with said rod and with said pivot.

8. A conveying system as defined in claim 5, said other unit being said vehicle unit and having an upper side facing said body and beyond which said entraining roller projects upwardly at least when in said extended position.

9. A conveying system as defined in claim 5, said other unit being said load-carrying unit and said body having an underside facing the ground and beyond which said roller projects downwardly at least when in said extended position.

* * * * *